(12) United States Patent
Carter

(10) Patent No.: US 7,193,644 B2
(45) Date of Patent: Mar. 20, 2007

(54) AUTOMATED AUDIO VIDEO MESSAGING AND ANSWERING SYSTEM

(75) Inventor: Ronald Carter, Matthews, NC (US)

(73) Assignee: Revolutionary Concepts, Inc., Matthews, NC (US)

( * ) Notice: Subject to any disclaimer, the term of this patent is extended or adjusted under 35 U.S.C. 154(b) by 383 days.

(21) Appl. No.: 10/682,185

(22) Filed: Oct. 9, 2003

(65) Prior Publication Data

US 2005/0285934 A1    Dec. 29, 2005

Related U.S. Application Data

(60) Provisional application No. 60/418,384, filed on Oct. 15, 2002.

(51) Int. Cl.
   *H04N 7/14* (2006.01)
(52) U.S. Cl. .............................. 348/14.06; 379/102.06
(58) Field of Classification Search .. 348/14.01–14.16, 348/143; 379/102.06, 167, 171
   See application file for complete search history.

(56) References Cited

U.S. PATENT DOCUMENTS

| | | | |
|---|---|---|---|
| 5,148,468 A | 9/1992 | Marrick et al. | |
| 5,303,300 A | 4/1994 | Eckstein | |
| 5,406,618 A | 4/1995 | Knuth et al. | |
| 5,657,380 A | 8/1997 | Mozer | |
| 5,896,165 A * | 4/1999 | Rao | 348/14.06 |
| D413,541 S | 9/1999 | Kaiser | |
| 5,966,432 A | 10/1999 | Buckler et al. | |
| 6,041,106 A | 3/2000 | Parsadayan et al. | |
| 6,049,598 A | 4/2000 | Peters et al. | |
| 6,185,294 B1 | 2/2001 | Chornenky et al. | |
| 6,233,328 B1 | 5/2001 | Wolf | |
| 6,324,261 B1 | 11/2001 | Merte | |
| 6,438,221 B1 * | 8/2002 | Lee et al. | 379/159 |
| 6,504,470 B2 | 1/2003 | Puchek et al. | |
| 6,509,924 B2 * | 1/2003 | Honguu et al. | 348/14.06 |

(Continued)

OTHER PUBLICATIONS

"New Invention Provides Security and Convenience", The Cape Fear Messenger, newspaper article published on Mar. 30, 1988.

(Continued)

*Primary Examiner*—Stella Woo
(74) *Attorney, Agent, or Firm*—Tillman Wright, PLLC; Chad D. Tillman; James D. Wright

(57) ABSTRACT

The invention is an audio-video communication and answering system that synergistically improves communication between an exterior and an interior of a business or residence and a remote location, enables messages to be stored and accessed from both locally and remotely, and enables viewing, listening, and recording from a remote location. The system's properties make it particularly suitable as a sophisticated door answering-messaging system. The system has a DVMS module on the exterior. The DVMS module has a proximity sensor, a video camera, a microphone, a speaker, an RF transmitter, and an RF receiver. The system also has a computerized controller with a graphic user interface DVMS database application. The computerized controller is in communication with a public switching telephone network, and an RF switching device. The RF switching device enables communication between the DVMS module and the computerized controller. The RF switching device can be in communication with other RF devices, such as a cell phone, PDA, or computer.

30 Claims, 5 Drawing Sheets

U.S. PATENT DOCUMENTS 6,762,788 B2 * 7/2004 Chang ..................... 348/14.02
7,015,946 B2 * 3/2006 Suzuki ....................... 348/156

OTHER PUBLICATIONS

"3006 Doorphone Trunk Port", publicly accessed via the Internet on May 13, 2002, <http://www.algosolutions.com/product/3006.htm>.

"Doorphone", publicly accessed via the Internet on May 13, 2002, <http://www.smarthome.com/images/5079dgmbig.jpg>.

"Nortel Venture wired phone system", publicly accessed via the Internet on May 13, 2002, <http://shop.store.yahoo.com/phonesystem/norvanwirsys.html>.

"Venture Specifications", publicly accessed via the Internet on May 13, 2002, <http://www.gd-wts.com/widts/Vendor%20Info/venture.htm>.

* cited by examiner

AUTOMATED AUDIO VIDEO MESSAGING AND ANSWERING SYSTEM

CROSS REFERENCE TO RELATED APPLICATION

This application claims the benefit of U.S. Provisional Application No. 60/418,384, filed on Oct. 15, 2002.

FIELD OF THE INVENTION

The present invention is generally a system for monitoring and interacting with a visitor at a residence or business, and more particularly a system for detecting the presence of a visitor, interactively communicating therewith at a heightened level of security, enabling automated entry, and generally enhancing and personalizing the overall process of receiving a visitor. The system utilizes new technology to synergistically improve messaging, communication, security and create time saving advantages for both the visitor and the provider of the system.

BACKGROUND OF THE INVENTION

There are numerous problems presently associated with receiving visitors at a home or office. When the resident is absent, there is often no message for the visitors, no means to leave an interactive message for the resident, and no means to ensure that unwanted access is not obtained. Moreover, answering the call of someone at a door of a dwelling can present certain security risks to an occupant therein. This situation can be especially inconvenient when, for example, a delivery or repair person arrives and the resident is not present. When the resident is present, on the other hand, there are also problems associated with receiving visitors. Some visitors may be unwelcome, for example, and it is often not evident that a visitor is a threat or an annoyance until after the door is open and it is too late. In the past, there have been many intercom-type doorbell systems which enable a person to speak to a visitor at the front door before opening it. None of these intercom-type devices, however, has stored messaging that makes them useful when the resident is away from home or unavailable. Moreover, none of these systems has communication capabilities with remote devices. Thus, they neglect to address many of the problems associated with receiving visitors.

U.S. Pat. No. 5,148,468 "Door answering system", which issued Sep. 15, 1992 to Marrick et al, discloses a door messaging system that records messages from visitors. This device, however, has no intercom capability for permitting the resident to speak with the visitor, nor does it have a screening capability whereby the resident can secretly monitor a message as it is being left by a visitor. Another disadvantage of this device is that, like many telephone messaging systems, its interaction with the owner is not intuitive or hands free, and its interaction with the visitor is limited to a single option. In addition, it is tape-based, therefore less robust, and less versatile than digital systems, and it requires custom wiring between the interior and exterior units.

U.S. Pat. No. 5,303,300 "Security door phone device", which issued Apr. 12, 1994 to Eckstein, discloses a device that calls a predetermined telephone when a visitor arrives at their door, thereby allowing residents to converse with the visitor via telephone, or allows their telephone answering machine take a message. The answering machine can also be used to screen visitors just as answering machines are often used to screen telephone calls. This device, however, has several disadvantages. Because the system relies upon a telephone for the intercom feature, it does not permit the resident to converse with the visitor while the telephone is in use. In addition, because the telephone answering machine is used for both telephone and visitor messaging, if the telephone is in use when a visitor arrives, then the visitor cannot leave a message and the resident can not screen the visitor. Moreover, since the same machine is used for both phone and door answering, the two types of messages can become easily confused. This system is also not self-contained since the messaging feature can only be performed in combination with a telephone and a telephone answering machine. This complication also increases the likelihood that the system will malfunction. Additional disadvantages are that this system has, like most telephone answering machines, a primitive messaging system, it lacks interactivity, and it requires custom wiring between the interior and exterior units. Most phone messaging devices have little or no automated interactivity with the caller or the resident, and have no video capabilities. The flexibility of their interaction is limited since only one message is played to a caller and only one option is given to the caller (i.e., to record a message or not). Although the resident has more interactivity with the device through the use of several buttons corresponding to different functions, such interaction is not intuitive and often has peculiarities that vary from one machine to the next.

In recent years, certain consumer devices have appeared that use speech synthesis or speech recognition to enhance interactivity with the user. For example, U.S. Pat. No. 5,406,618 "Voice activated, hands free telephone answering device" issued Apr. 11, 1995 to Knuth, et al. discloses a telephone answering device that is activated by a proximity sensor and whose operation is controlled by simple voice commands by the resident. The device incorporates voice recognition circuitry to respond to spoken commands of the user that are elicited by a system generated voice request menu. The telephone-answering device performs all the basic functions of a telephone answering machine in response to these simple commands and there is no need for the user to manually operate the telephone-answering device. This telephone-answering device, however, is not designed for or capable of addressing the need for a door messaging and intercom system. Indeed, even if it were used in combination with the telephone intercom device of Eckstein, it still has serious deficiencies with the intercom and messaging features due to its reliance on the telephone connection. Moreover, such a combination only enhances the interactivity of the resident with the machine, and does not enhance the interactivity of the visitor with the machine. The visitor is still faced with a primitive messaging system with no interactivity. No prior art messaging system has flexible and intuitive interactivity with the visitor or caller.

U.S. Pat. No. 5,657,380 is an "Interactive door answering and messaging device with speech synthesis" that issued to Mozer on Aug. 12, 1997. Mozer discloses an automatic door answering and message system. The system comprises an interior unit and an exterior unit that communicate via an RF Link. Further, the system uses voice recognition to interact with visitors. The system fails to provide a user with the option of communicating through a variety of peripheral devices. Moreover, the system fails to provide a centralized control system having a user friendly application that coordinates the various communication scenarios commonly availed to a modem user, who has access to an array of remote peripheral communication devices (i.e., cell phone, video phones, hand-held computers, PDA's, etc.). The Mozer system also does not provide a means to handle the mundane day-to-day interaction with visitors who have a wide range of technological sophistication. Furthermore, the Mozer system is not intuitive and does not employ both video and audio technology to synergistically personalize messaging and communication, while improving security. Still further, the system fails to provide a security alarm option, which signals a predetermined address of a security breach.

There remains a need, therefore, for a self-contained door communication and messaging device that has simple and intuitive interactivity with the visitor, that has messaging capability permitting incoming and outgoing messages to be easily recorded and played, that permits the resident to screen visitors, that permits the resident to speak with visitors without opening the door, that does not require wiring from the exterior to the interior, that provides a centralized control system utilizing a user-friendly application, that provides a means for storing digital images, that provides enhanced security features, that is relatively inexpensive, and that is easy to install.

SUMMARY OF THE INVENTION

The invention is an audio-video communication and answering system that synergistically improves communication between an exterior and an interior of a business or residence and a remote location, communication between two or more rooms and a remote location, leaving messages at a centralized location from a local or remote location, and as a novel monitoring system for viewing, listening, and recording from a remote location. As will become obvious from the description, the system is inherently extensible in both form and function, and is designed so that it can be expanded to include multiple peripheral devices, both in direct communication with a computerized controller running a graphic user interface DVMS database application, and indirectly through the Internet and the public-switching telephone network (PSTN). Peripheral devices that are in direct contact with the computerized controller via a radio frequency (RF) link are designated as a DVMS device, as they communicate via short-range RF waves that have a direct view, and these peripheral devices are used to receive and convey messages to the other similar peripheral devices, as well as the computerized controller. Remote peripheral devices generally are in communication via established institutional channels, such as the Internet, satellite systems, PSTN, cell systems, cable systems, and to a lesser extent, long-wave length systems. Remote peripheral devices are selected from the group consisting of cell phones, telephones, video-cell phones, computers, personal digital assistants, video-personal digital assistants, satellite telephones, transceivers, pagers, and other analog or digital communication devices.

The centralized controller can be augmented with various switching devices to expand and control the peripherals. Many of the disclosed peripherals are commonly housed in a personal computer. Newer PC systems typically come with a variety of stock audio-video peripherals such as a video camera and DVD read/write devices, communication devices such as telephone/fax ports, networking ports for hard-wired and wireless LANs, and come with large amounts of fast access memory, such as hard drives, CD-ROM read/write, and RAM. These peripherals are off-the-shelf, and are suitable for the disclosed system. The disclosed system can be configured to accommodate audio-video communication and answering applications having a range of complexity.

The basic system is comprised of: a DVMS module, having a proximity sensor, a video camera, a microphone, a speaker, an RF transmitter, an RF receiver, and a keypad; a computerized controller with a graphic user interface DVMS database application, wherein the computerized controller is in communication with a public switching telephone network; an RF switching device, wherein the RF switching device enables communication between the DVMS module and the computerized controller and, depending on how the system is configured, the RF switching device is in communication with other RF devices; a recording means for recording video and audio communication that is transmitted to and from the DVMS module; a playing means for playing video and audio communication stored on the recording means, or other storage devices having rapidly accessible data; a speaker; and a remote peripheral device. The DVMS database application coordinates the multiple communication devices, and it is used to define responses to prompts and events.

The DVMS module preferably also has a display screen that is a LCD screen. The keypad can be a LCD touch screen or a keyboard. The DVMS module is portable, and has a locking mechanism for fastening it to a holster. The DVMS module has an electrical receptacle that enables it to be quickly attached to an electrical source.

A desired additional peripheral for the audio-video communication and answering system is a DVMS transceiver having a display screen, a microphone, a speaker, a limited range RF transmitter, a RF receiver, and a keypad. As previously mentioned, a DVMS peripheral device communicates directly with the computerized controller.

The display screen on the DVMS transceiver and the DVMS module preferably has a low energy screen like a LCD screen, which is an advantageous feature, in that besides reducing energy consumption, it enables text messaging. Text messaging allows one to communicate with a visitor privately.

In systems that are principally going to be used to control access to the premises, then the system also includes an electronically actuated lock, which can be unlocked by the computerized controller.

It is anticipated that in certain deployments of the invention that voice recognition would be useful, particularly when the system enables access to the premises. Voice recognition adds another layer of security, and can be used to facilitate those individuals who are unable to press a keypad. Similarly, as the base system records video image recognition of faces, eyes and fingerprints can also be included in the system.

Commonly, prompts are generated either as a stored audio message or by voice synthesis. The audio-video communication and answering system can use either mechanism to generate the prompts, and the system can be configured accordingly. Voice synthesis is slightly faster and more reliable and has recognized advantages at a small incremental cost.

The computerized controller of the audio-video communication and answering system preferably has a battery backup, and a means for detecting a loss in electrical power. Thereby, when power is lost there will be sufficient time to notify those responsible for the maintenance of the system that there has been a loss of electricity. There are a couple of reasons that make this a particularly important feature. If there is no power, then it is possible that there has been a break in. In addition, if there is no power then other appliance, such as refrigerators, air conditioners, and heaters cannot function, and when they do not work, significant damage often results when their failure goes undetected for a sustained period of time.

The database application is administered by the administrator, who defines the users, who in the case of the instant invention are called occupants, reflecting their status on the premises. The occupants have various levels of access to the database, depending on the privileges set by the administrator. Other examples of settings determined by the administrator are aliases for a declared occupant, whom may also be known as (i.e., "Daddy" or "Momma"), passwords to access the database; access codes to actuate a lock, a number that corresponds to an occupant's name, and at least one telephone number where an occupant can be reached. Voice, text, and video messages may also be sent via email, and the administrator can set up redundant systems. Further, the administrator can use default prompts for interacting with a visitor, or he can create his own. The administrator chooses a prompt for greeting a visitor; an announcement that is to be given over the speaker when a visitor arrives; a prompt for requesting information from a visitor; a request instructing a visitor as to their choices in leaving a message or contacting a declared user; and the action that is to be initiated by the system based on the input by the visitor. The invention can be configured to play background music or videos at different times of the year, and/or different times of the day to reflect seasonal holidays, birthdays, and events. For instance, on Halloween the administrator may wish to have scary music and howls issuing from the DVMS module. The administrator can tailor the security/premise monitoring response to designate the telephone numbers that are to be called when there is a loss of power; emergency numbers that are to be automatically called (i.e., the police, the fire department, relatives, private security companies), and a log of self checks to confirm that all the components of the system are operational. Also, depending on the size of the system the administrator may wish to set the level of security that the system is to operate under, particularly with respect to via the dedicated digital communication channel (i.e., the Internet and the Grid). As hardware is added, such as the number of the DVMS modules and DVMS transceivers, the network should be updated. Also, the administrator can define the preferred hierarchy of storage of audio and video data, the location and number of backup devices, and whether replications of the database are to be kept.

In view of the foregoing disadvantages inherent in the known types of audio-video communication and answering systems now present in the prior art, the present invention provides an improved system. As such, the general purpose of the present invention, which will be described, subsequently, in greater detail is to provide a new and improved system, which has the advantages of the prior art and none of the disadvantages.

In this respect, before explaining at least one embodiment of the invention in detail, it is to be understood that the invention is not limited in its application to the detailed construction and to the arrangements of the components set forth in the following description illustrated in the drawings. The invention is capable of other embodiments and of being practiced and carried out in various ways. Also, it is to be understood that the phraseology and terminology employed herein are for the purpose of the description and should not be regarded as limiting.

The invention is a method for audio-video greeting and communicating with visitors of a business or residence. The method is comprised of detecting the presence of a visitor via the proximity sensor of the DVMS module, where the DVMS module is mounted at or near an entrance to the business or residence, wherein upon detection the computerized controller is signaled that a visitor is present. The recording means is actuated, and the recording is stored in the database along with a beginning time-stamp. The arrival of a visitor is broadcast over a speaker within the premises. An occupant can view the visitor on the DVMS transceiver or on the computerized controller display monitor, and initiate a conversation at any time. The DVMS module issues a greeting to the visitor, and instructs the visitor to select a number from the keypad, which designates whom they wish to visit. The entered number is transmitting from the DVMS module to the GUI database application, where the application confirms that the number corresponds to an occupant "y", who is "officially" present. An error message is generated if no individual corresponds to the number entered. While this is going on, the door may be answered at any time, thereby resetting the application to look for another visitor. The application keeps track of the number of times a wrong number is entered and can generate a variety of responses to pranks, including calling the police, issuing warnings and/or a loud noise, or just thanking the visitor and asking him to return another time. If no one corresponds to the number, the visitor is prompted to select and press another number on the keypad, designating whom he or she wish to visit. The method then re-lists the choices. If appropriate, when the number matches an occupant who is on the premises, the speaker broadcasts that the visitor is here to see occupant "y". Occupant "y" can signal the computerized controller to take a message, or occupant "y" may choose to use the DVMS transceiver to speak directly with the visitor, or occupant "y" can answer the door. If appropriate, the DVMS module issues a prompt stating that occupant "y" is not available and asks the visitor if they wish to speak to occupant "y" or to leave a message. If appropriate, at any time the application can initiate a call to occupant "y", and record both sides of the conversation. The occupant can only view the visitor, or initiate a conversation. When a call is made to any remote peripheral device, the dial tones are muted so that a visitor cannot record the tones. A visitor never knows where the occupant is, unless the occupant tells the visitor. A visitor never knows if the occupant can be contacted, or if the occupant has just instructed the application to take a message. If the visitor has elected to leave a message then the method prompts the visitor to begin his message and then, optionally, offers him a chance to review and approve his message. The message or call is stored in the database with a beginning timestamp and an ending timestamp, along with the occupant's mailbox number. At the end of the call or message, the application can issue a closing statement and return to background music, if programmed to do so. When the visitor departs, and is out of the range of the proximity sensor all recording is stopped and saved in the database record, along with an ending timestamp. The occupant "y" can selectively sort to view the entire recorded visit, or just the message. If the proximity sensor indicates that there is another visitor, the method cycles back to the greeting step.

Using the method the conversation or messages can be relayed to the selected occupant, without the visitor ever knowing where the occupant is. Only the occupant can disclose his location to the visitor.

If the system has an electronically actuated lock, then the method can also be comprised of the steps of checking the number entered by the visitor to determine if it is a valid access code. If the number is valid then actuating the lock, and if the number is not valid, prompting the visitor to re-enter the code, or if assistance is needed to enter a number that corresponds to one of the occupants. If an occupant is selected, calling the selected occupant. The occupant has the option of remotely entering the access code, therein actuating the electronically actuated lock, or instructing the GUI database application to go to a new high security level, wherein the lock cannot be accessed and notifying the visitor that the access code is not operational. If the visitor enters an access code, checking the code, and tracking how many times the wrong code is entered. Checking the database application if the maximum allowed number of wrong entries have been made. When the maximum number of entries is reached, either automatically calling a designated party and/or removing access privileges. Looping back to the first step.

In the method, upon the entering of a valid access code assigned to a declared occupant, the application optionally notifies the administrator or his designated representative that the declared occupant has now entered the premises of the business or residence. (The administrator would know who the individual should be. The administrator can confirm, by remotely viewing the recorded video, that the actual person who entered the access code is the declared occupant, and/or make a follow-up telephone call to the premises.

As such, those skilled in the art will appreciate that the conception, upon which the disclosure is based, may readily be utilized as a basis for the designing of other structures, methods, and systems for carrying out the several purposes of the present invention. It is important, therefore, that the claims be regarded as including such equivalent constructions in so far as they do not depart form the spirit and scope of the present invention

OBJECTS OF THE INVENTION

The principal object of the present invention is to provide an audio-video communication and answering system that can be used as a door answering system.

A further object of the present invention is to provide an improved door answering system which provides the option of having a visitor converse with an occupant, leave a message, or contact a remote device for communication with the occupant.

A still further object of the present invention is to provide an audio-video communication and answering system, which upon sensing that a visitor is proximate, to digitally record the visitor. The recording can be viewed in real time, or at a later time, either locally or remotely.

A still further object of the present invention is to provide an audio-video communication and answering system that is simple to operate by both the occupant and the visitor.

A still further object of the present invention is to provide an improved door answering system which activates an alarm and or initiates calls to designated institutions and individuals when there is a security breach.

A still further object of the present invention is to provide an improved door answering system which allows the administrator or his designated representative to remotely permit entrance to a building by visitors.

A still further object of the present invention is to provide an audio-video greeting and communicating system that can be tailored to reflect holidays, special occasions, and various levels of security.

Another object of the present invention is to provide an audio-video greeting and communicating system that can be configured to contact the administrator or his designated representatives that when there is a loss of electrical power.

These together with other objects of the present invention, along with various features of novelty, which characterize the invention, are pointed out with particularity in the claims and form part of the disclosure. For better understanding of the invention, its operating advantages, and the specific objects obtained by its uses, reference to the accompanying drawings and descriptive manner should be made, which are illustrated of preferred embodiments of this invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings in which.

Figure 1:
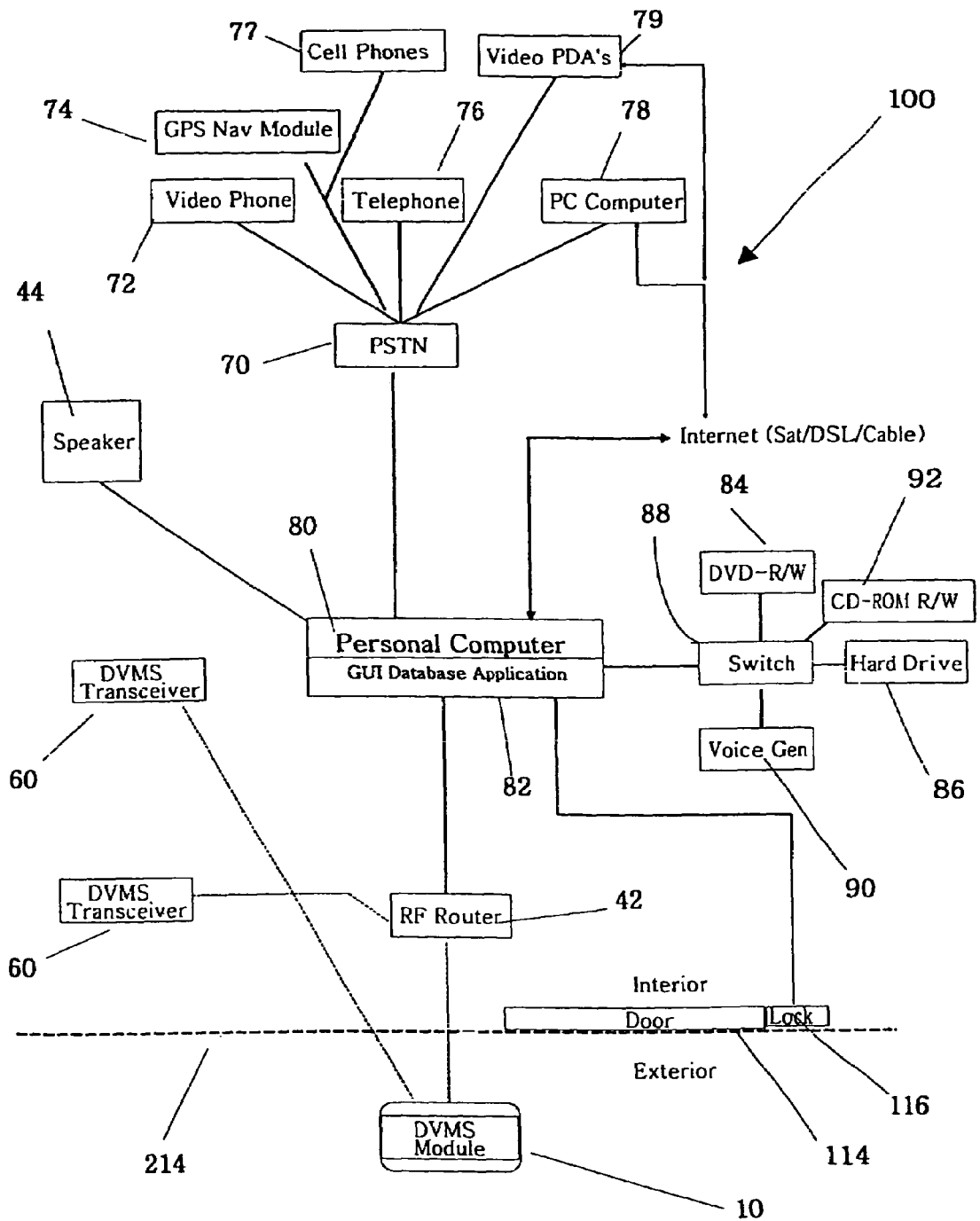
FIG. 1 is a schematic diagram of the illustrated embodiment of the present invention.

It is to be understood that the drawings are merely illustrative of the invention and are not meant to limit the claims. Various modifications and additions may be made to the apparatus by those skilled in the art, without the parting of the spirit and scope of this invention, which is therefore understood to be limited only by the scope of the appended claims. Further, the same reference numerals refer to the same parts throughout the various figures.

DETAILED DESCRIPTION OF THE ILLUSTRATED EMBODIMENT

The major components of the audio-video communication and answering system 100 are schematically shown in FIG. 1. The exterior of a premises is differentiated from the interior by a demarcation line 214, which represents a wall or other similar structure. The wall 214 has a door 114 and an electronically actuated lock 116. On the exterior is a DVMS module 10, which is in wireless communication with a wireless RF router 42 that is on the interior. It is anticipated that there could be multiple entrances to the premises and multiple DVMS modules. The RF router 42, as shown in FIG. 1, is separate from the computerized controller, which is a personal computer 80, however, the RF router 42 could easily be part of the personal computer 80. A DVMS device is a device that communicates via short-range RF waves (preferably FM) that have a direct view, in that the RF waves can pass through doors, walls and floors. These peripheral devices are used to receive and convey messages to other DVMS devices, as well as the personal computer 80. Also in communication with the RF router 42 is a DVMS transceiver 60. Two are shown, but obviously there could be less or more. A speaker 44 is in communication with the personal computer 80. The speaker 44 is not shown as wireless, but could be. One is shown, but obviously there could be more. A DVMS Database Application 82 is running on the PC 80. The DVMS Database Application, in concert with the operating system, controls the communication to the audio-video equipment, including the DVD-R/W 84, the CD-ROM R/W 92, and the hard drive 86. Depending on the owner's preference, there is no critical need for the DVD 84 nor for the write functionality of the CD-ROM 92, however, a larger hard drive would then be necessary. Typically, these components are housed in the PC, but for clarity they have been shown outside, connected to a switch 88 instead of a bus. Depending on the switch 88, additional audio-video storage devices can be used. No camera is shown, as it is not critical to the system, but obviously any number of cameras could also be employed on the interior. Also shown is a voice generator 90, and this is used to generate the prompts, which either exists as pre-recorded messages, or are generated by a voice synthesizer. The personal computer, as previously stated, is connected to the Internet. The connection can be by satellite, DSL, or cable modems. An expanded version of the Internet known as the Grid can also be accessed. The personal computer 80 can actuate the lock 116. The personal computer, as previously stated, is also connected to the public switching telephone network (PSTN), which in turn enables communication with any device that connects to it, including GPS navigational systems (i.e., ONSTAR®) 74, Video phones 72, cell phones 76 and PC computers 78, which include the personal digital assistants, PC's, laptops, etc. This last category, in addition to using telephone lines, can also communicate over the Internet. While not explicitly shown, it is anticipated that in addition to voice generation, the application can utilize voice recognition and image recognition.

Figure 2:
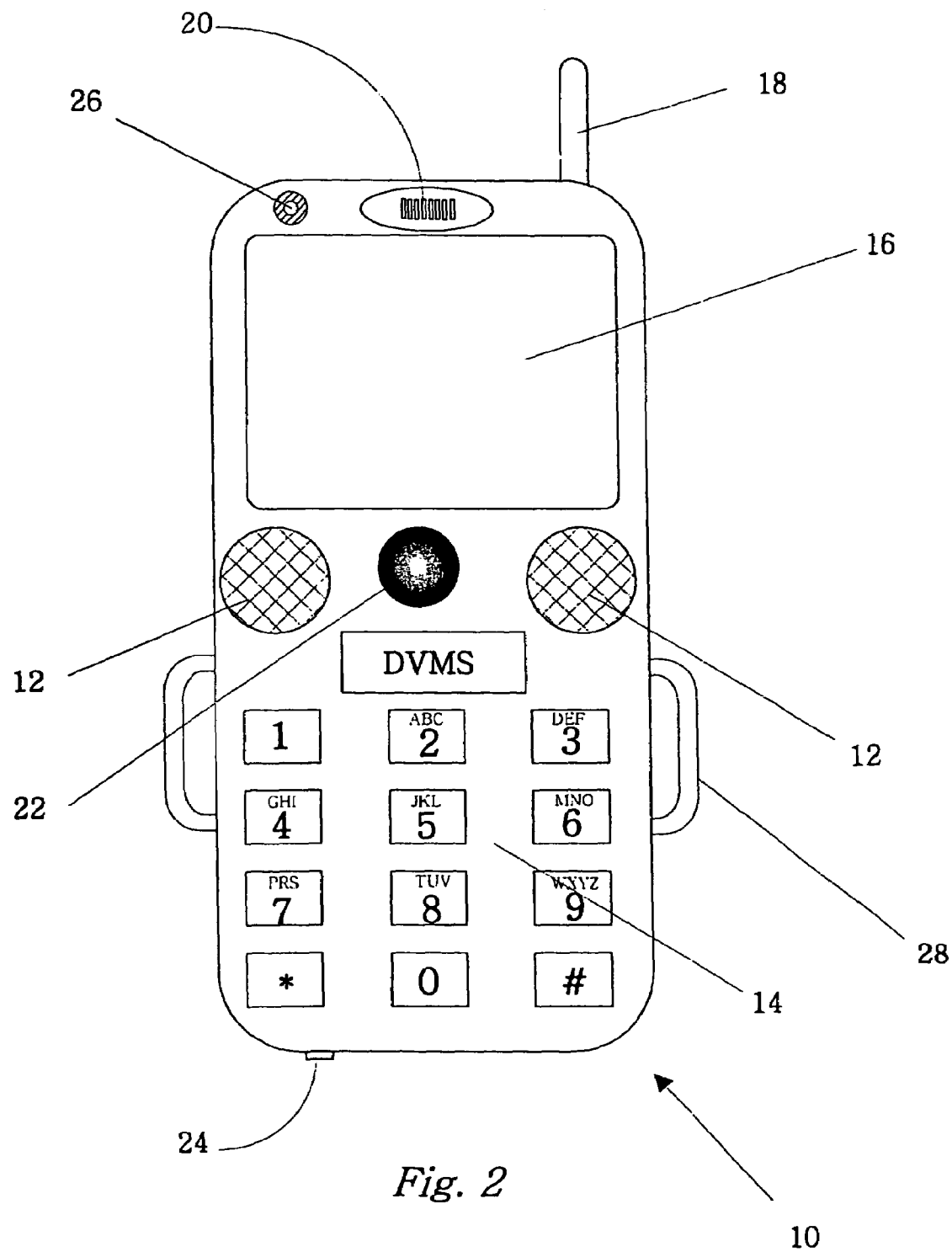
FIG. 2 is a planar view of the DVMS module.

The DVMS module 10 is shown in FIG. 2. As is readily seen in the figure, the DVMS module is capable of being portable, much like a cell phone. However, there are some important distinctions, the most notable being that it communicates by short-range RF. The DVMS module 10 can be securely mounted and quickly connected to an electrical source. It is small, not much larger than a credit card, and is readily adaptable for use in external residential or commercial locations. The DVMS module is comprised of: a camera 22, at least one speaker 12, a proximity sensor 26, a microphone 20, a LCD display 16, a locking mechanism 28, a quick connect electrical receptacle 24, a RF FM receiver/transmitter 18, and a keypad 14. The DVMS module 10 can, optionally, have a small portable energy source, such as a battery. The DVMS module 10 can be mounted in a holster (not shown). The LCD display can be used to send and receive text. Alphanumeric code can be generated by the keypad. The camera 22 is activated by the proximity sensor 26, which in turn relays an image, or streaming video to the PC 80 where it is saved in the database with a timestamp. The locking mechanism 28 enables the DVMS module 10 to be installed securely wherever holstered, or to be moved to some other remote location, if desired. Preferably, the DVMS module 10 is connected to an electrical supply having a battery backup.

Figure 3:
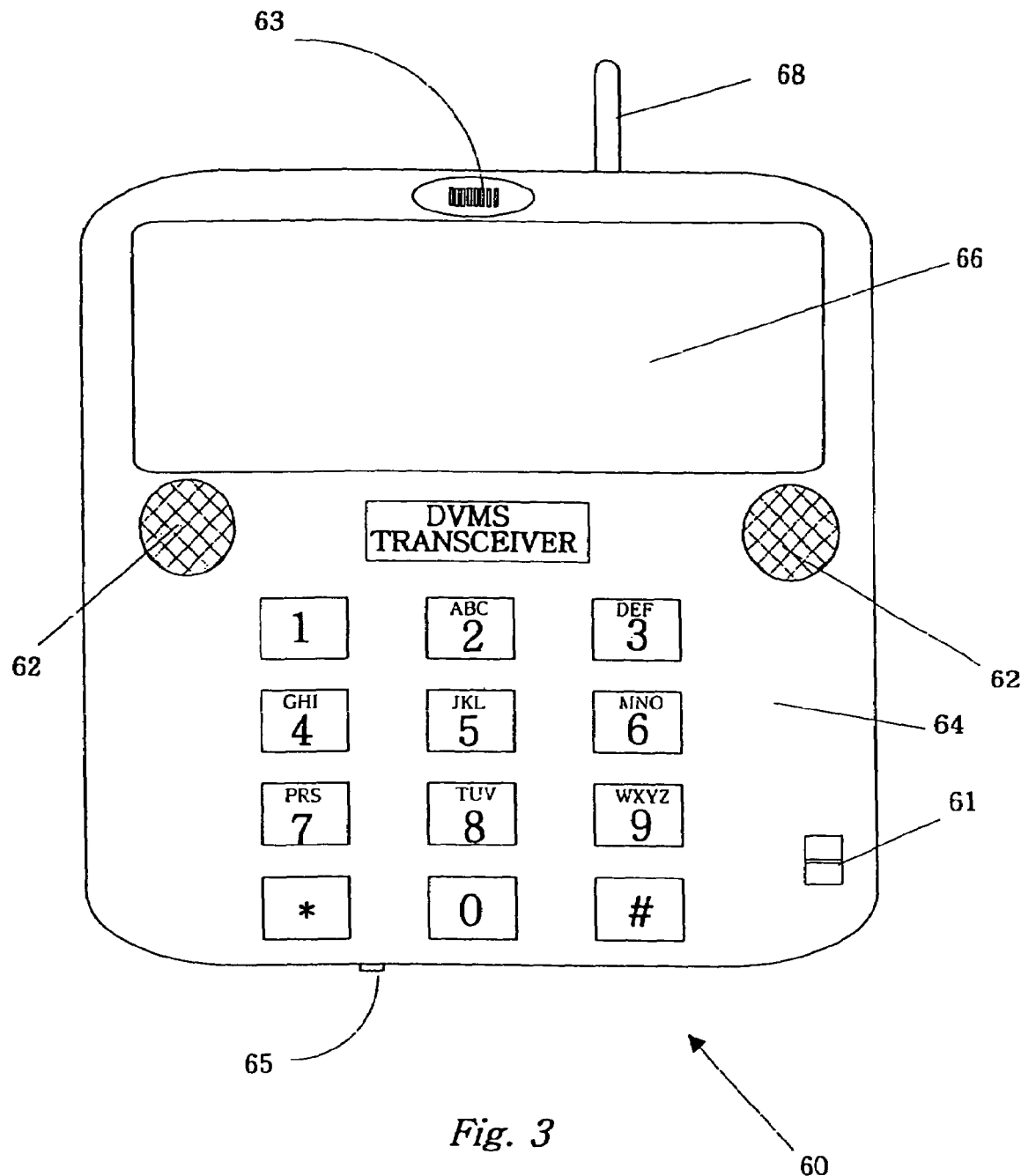
FIG. 3 is a planar view of the DVMS transceiver.

Referring to FIG. 3, the DVMS transceiver 60 is portable and has many of the same components as the DVMS module 10. Like the DVMS module 10, the DVMS transceiver 60 communicates by short-range RF. Unlike the DVMS module 10, the DVMS transceiver 60 does not have weather resistance because it is used in the interior. The DVMS transceiver 60 is comprised of: at least one speaker 62, a microphone 50, a LCD display 66, a quick connect electrical receptacle 65 for charging, a RF FM receiver/transmitter 68, and a keypad 64. The LCD display 66 can be used to send and receive text. Alphanumeric code can be generated by the keypad 66. In a preferred embodiment the DVMS transceiver has a mute switch 61, which cuts off the microphone 63, thus assuring the user that if he wishes he can just monitor a video without ever accidentally sending an audible signal.

Figure 4:
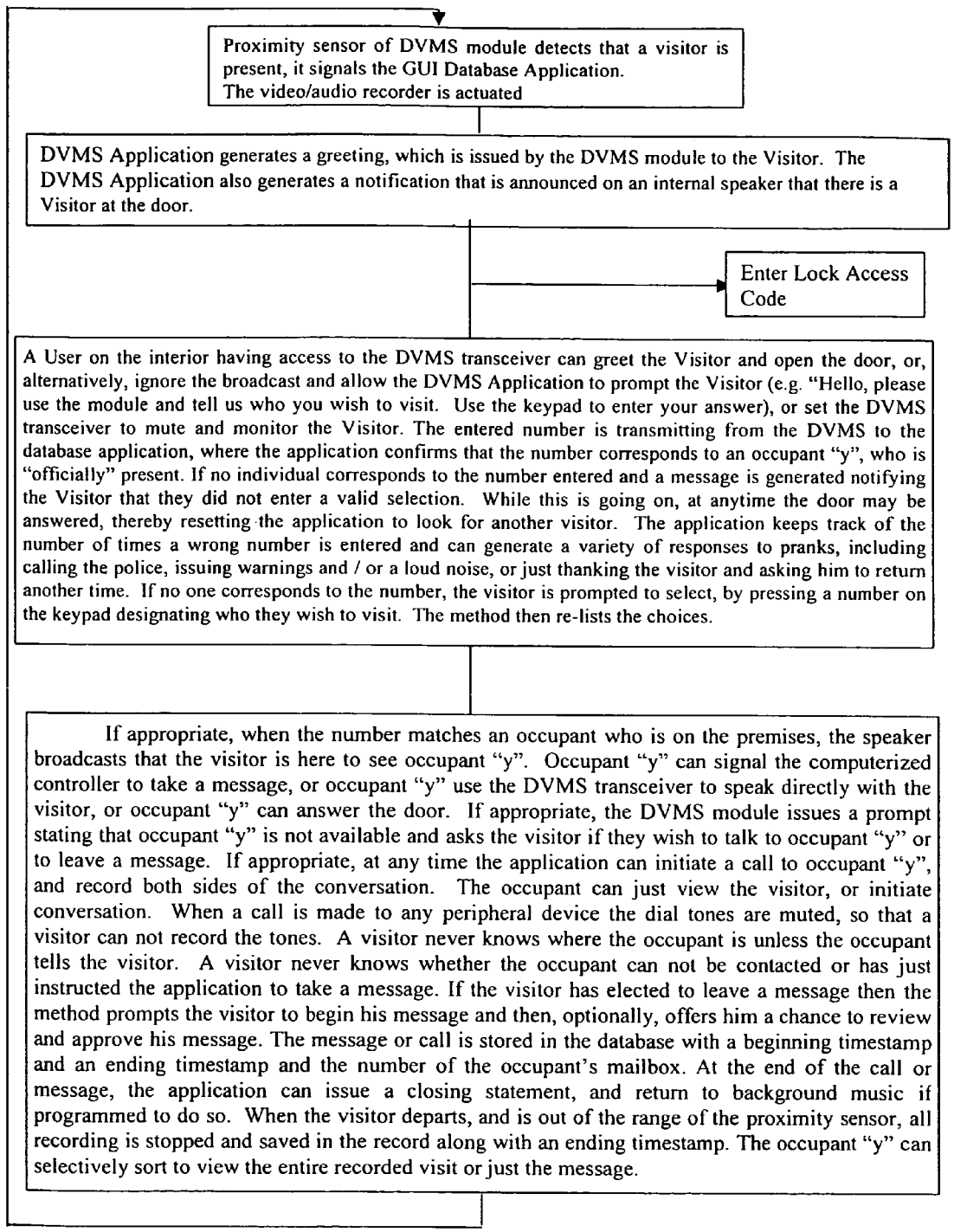
FIG. 4 is a block diagram overview of the method wherein the audio-video communication and answering system is employed as a door answering and messaging system.

Referring to FIG. 4, which is a block diagram of the method wherein the audio-video communication and answering system is employed as a door answering and messaging system. The block diagram takes the reader through a typical scenario when the invention is deployed at a residence.

Figure 5:
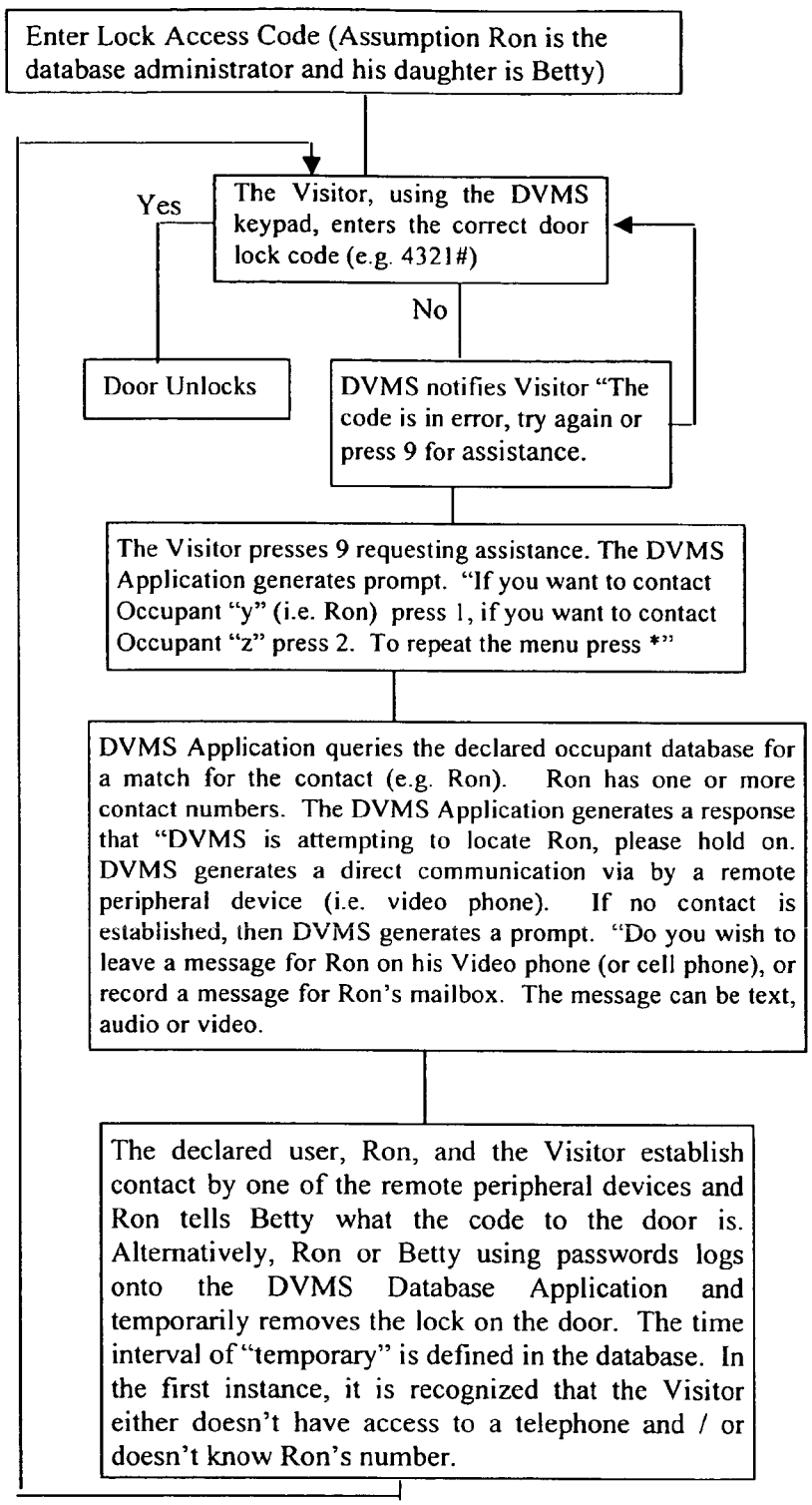
FIG. 5 a block diagram extension of the method described in FIG. 4 wherein, additionally, there is an electronically actuated lock.

Referring to FIG. 5, which is a block diagram extension of the method described in FIG. 4 wherein, additionally, there is an electronically actuated lock. In the given scenario, one of the occupants is attempting to gain access to the premises. The block diagram walks the reader through the DVMS database application method.

In the foregoing specification, the invention has been described with reference to specific embodiments thereof. It will, however, be evident that various modifications and changes may be made thereto, without departing from the broader spirit and scope of the invention. Accordingly, the specification and drawings are to be regarded in an illustrative, rather than a restrictive sense. It is the intention to cover these and any other changes or modifications to the disclosed embodiments, which are encompassed by the claims appended hereto.

SUMMARY OF THE ACHIEVEMENT OF THE OBJECTS OF THE INVENTION

From the foregoing, it is readily apparent that we have invented an improved, audio-video communication and answering system that can be deployed as a door answering system.

The system provides the options of allowing the visitor to converse with the occupant, leaving a message, or calling a remote peripheral device for communication with the occupant when he is either not present or unavailable. The visit is recorded and time stamped for sorting or viewing either in real time or at a later date. The system achieves these features, while still presenting a system that is intuitive and easy to use. The system further enables an electronically actuated lock to be accessed by entering an access code, either with the DVMS module or remotely. A unique feature of the system is that when electrical power is lost, the system can be configured to call the administrator, or his designated representative, alerting him of the problem. The audio-video communication and answering system has esoteric features not found in the prior art, such as the flexibility to change a greeting, or prompt to reflect holidays, and special occasions. The system can incorporate music or sounds not found with answering systems, or even play images in the case where the DVMS module has an LCD display. Finally, the system allows the occupants to achieve a higher level of security and anonymity, if so desired.

The invention enables the administrator or a declared occupant to at any time to turn on the camera(s) and view the image(s), access the recorded the video images, or post a video image from his remote peripheral device to the video recorder.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An audio-video communication and answering system, said system comprising:
   (a) at least one wireless exterior module having a proximity sensor, a video camera, a microphone, a speaker, an RF transmitter, and an RF receiver;
   (b) a computerized controller running a software application;
   (c) a wireless router, wherein the wireless router enables communication between the exterior module and the computerized controller;
   (d) a recording component that records video and audio communication that is transmitted to and from the exterior module; and
   (e) a playing component that plays video and audio communication recorded by the recording component;
   (f) wherein the software application includes a graphic user interface that enables a user to view images and streaming video from the camera, and that enables the coordination of multiple communication devices and user defined responses to prompts and events.

2. The audio-video communication and answering system as claimed in claim 1, wherein the exterior module has a display screen.

3. The audio-video communication and answering system as claimed in claim 1, wherein the system is further comprised of an electronic connection to a public switching telephone network.

4. The audio-video communication and answering system as claimed in claim 1, wherein the exterior module is further comprised of a keypad that is a touch screen or a keyboard.

5. The audio-video communication and answering system as claimed in claim 4, wherein the exterior module is portable, has a locking mechanism, and an electrical receptacle for quickly attaching to a source of electricity.

6. The audio-video communication and answering system as claimed in claim 5, wherein the portable exterior module has a portable energy source and is secured in a holster.

7. An audio-video communication and answering system according to claim 1, wherein the system is further comprised of an interior transceiver having a display screen, a microphone, a speaker, an RF transmitter, and an RF receiver.

8. An audio-video communication and answering system according to claim 7, wherein the computerized controller is a personal computer.

9. The audio-video communication and answering system according to claim 8, wherein the personal computer has a video camera.

10. The audio-video communication and answering system according to claim 8, wherein the personal computer controls at least one additional storage device selected from the group consisting of a CD-ROM R/W, a DVD R/W, a camera card, a tape drive, and a hard drive.

11. The audio-video communication and answering system according to claim 7, wherein the interior transceiver can be used to generate text messaging.

12. An audio-video communication and answering system according to claim 1, wherein the system is connected to a digital communication channel selected from the group consisting of DSL, satellite, cable, wireless, and a combination thereof, where the digital communication channel is in communication through the Internet, the Grid, satellite systems, and other information sharing systems.

13. The audio-video communication and answering system according to claim 1, wherein said system is further comprised of remote peripheral devices selected from the group consisting of cell phones, telephones, video-cell phones, computers, personal digital assistants, video-personal digital assistants, satellite telephones, transceivers, pagers, and other digital communication devices.

14. The audio-video communication and answering system according to claim 13, wherein the video camera can be remotely actuated and streaming video can be viewed.

15. An audio-video communication and answering system according to claim 13, wherein the system is further comprised of an electronically actuated lock, which can be unlocked by the computerized controller.

16. An audio-video communication and answering system according to claim 15, wherein the system is further comprised of a voice recognition module.

17. An audio-video communication and answering system according to claim 15, wherein the system is further comprised of an image recognition module.

18. An audio-video communication and answering system according to claim 15, wherein the system is further comprised of a voice-generation apparatus.

19. The audio-video communication and answering system according to claim 18, wherein the voice generation apparatus is a voice synthesizer.

20. An audio-video communication and answering system according to claim 18, wherein the system is further comprised of a battery backup.

21. An audio-video communication and answering system according to claim 20, wherein the system is further comprised of a component that detects a loss in electrical power, and that sends a message to at least one remote peripheral device that there has been a loss of electrical power.

22. The audio-video communication and answering system according to claim 21, wherein the software application has various levels of access to a database defined by privileges, wherein there is at least one declared occupant and an administrator, and wherein the at least one declared occupant is a named individual who has privileges to actuate the lock by entering an access code into the exterior module.

23. An audio-video communication and answering system according to claim 11, wherein a communication interface is further provided for communicating with an alarm at a remote location to signal that there has been a security breach of the lock.

24. The audio-video communication and answering system according to claim 22, wherein the software application contains multiple control settings, wherein said control settings include a telephone number that is to be called when there is a loss of power; a list of declared occupants; alias names of declared occupants; one or more telephone numbers and messages addresses for the declared occupant; emergency numbers that are to be automatically called, such as the police, the fire department, relatives, private security companies; passwords for access to the database; privilege levels of the declared occupants, access codes for actuating the lock; a maximum number of wrong access code entries, before access is denied; either a default or a customized prompt for greeting a visitor; a prompt for requesting information from a visitor; a request instructing a visitor as to their choices in leaving a message, or contacting the declared occupant; an action that is to be initiated by the system based on the input by the visitor; a selection of background music or a video that is to be played at a particular time and date; a level of security that the system is to operate under; a hierarchy of storage of audio and video data; a location and number of backup devices and replications of the database; a number and network designation of exterior modules and interior transceivers; and a log of self-checks to confirm that all the components of the system are operational.

25. An audio-video communication and answering system according to claim 24, further comprising a voice recognition system.

26. A method for audio-video greeting and communicating with visitors at a business or residence, wherein said method utilizes at least one exterior module having a proximity sensor, a video camera, a microphone, a speaker, an RF transmitter, an RF receiver; a computerized controller, wherein the computerized controller has components for playing and recording video and audio media; an RF switching device that enables communication between the exterior module and the computerized controller; and a software application; said method comprising:
 (a) detecting the presence of a visitor via the proximity sensor of the exterior module, where the exterior module is mounted at or near an entrance, wherein upon detection the computerized controller is signaled that a visitor is present;
 (b) actuating the components for playing and recording video and audio media, and saving a recording in a location in the database with a beginning time-stamp;
 (c) broadcasting that a visitor is present;
 (d) issuing a greeting to the visitor, and asking the visitor to state a reason for their visit;
 (e) observing an image or video of the visitor displayed on the computerized controller;
 (f) if appropriate, issuing a prompt stating that occupant "y" is not available and asking the visitor if they wish to talk to occupant "y" or to leave a message;
 (g) if appropriate, initiating a call to occupant "y";
 (h) if appropriate, asking the visitor to begin his message;
 (i) attaching a message beginning with a timestamp and an occupant mailbox designation in the database;
 (j) time stamping the end of message;
 (k) if appropriate, issuing a closing statement;
 (l) when the visitor has finished the message and is out of the range of the proximity sensor, stopping all recording and time stamping the end of the recording, wherein the occupant "y" can, remotely or locally, selectively sort and view the entire recorded visit or just the message.

27. A method for audio-video greeting and communicating with visitors of a business or residence according to claim 26, wherein said method further utilizes an electronically actuated lock, said method further comprising, upon a visitor entering an access code into the exterior module, checking the database to confirm that the access code is correct and actuating the lock if correct.

28. A method for audio-video greeting and communicating with visitors of a business or residence according to claim 27, said method further comprising, upon entrance of the visitor entering an access code into the exterior module that corresponds to the access code assigned to a declared occupant, notifying a specified occupant that the declared occupant has now entered the premises.

29. A method for audio-video greeting and communicating with visitors of a business or residence according to claim 27, wherein the specified occupant can remotely monitor or review the visitor entering the access code.

30. A method for audio-video greeting and communicating with visitors of a business or residence according to claim 27, wherein a maximum number of wrong entries of the access code automatically actuates a call to the specified occupant, and/or shuts down access to the premises.

* * * * *